April 21, 1931.  F. C. McELROY  1,801,357
VEHICLE HEAD LAMP
Filed Dec. 24, 1927
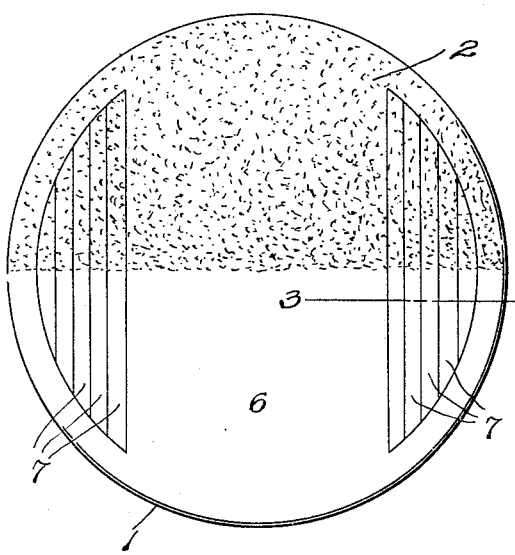
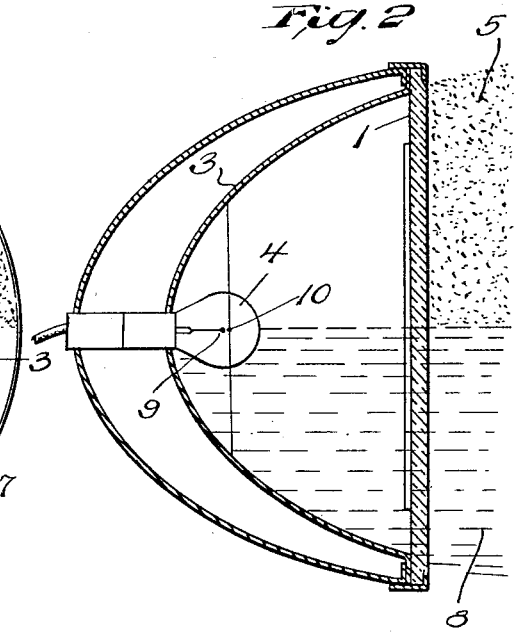
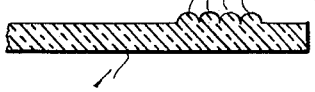
Inventor
Frank C. McElroy
By W. S. McDowell
Attorney Patented Apr. 21, 1931

1,801,357

UNITED STATES PATENT OFFICE

FRANK C. McELROY, OF COLUMBUS, OHIO

VEHICLE HEAD LAMP

Application filed December 24, 1927. Serial No. 242,355.

This invention relates to improvements in vehicle head lamps, the primary object of the invention being the provision of a lamp construction for the purpose set forth wherein the passage of light therethrough is so controlled and regulated that the resultant light beams issuing from the lens of the lamp will be directed and concentrated upon road or highway areas to provide strong and efficient illumination of the desired areas or zones to the exclusion of such zones or areas which, if illuminated, would serve no effective purpose.

Another object of the invention resides in the provision of a lens which is of such form that when used on a vehicle headlamp in connection with a source of light having a predetermined focal relationship with a substantially parabolic reflector, prevents any substantial disperson of light in such zones or areas that would tend to interfere with or impair the vision of vehicle operators or other observers approaching the vehicle on which such lens is used.

A further object of the invention resides in forming the lens to include prismatic surfaces by means of which a portion of the light passing through the lens is deflected and projected laterally to each side of the lens or associated motor vehicle for the purpose of illuminating the curbing or the side of a highway.

Still, a further object of the invention resides in the provision of a lens of the above character wherein substantially one-half of the area of the lens possesses substantially translucent properties, the said translucent area serving to permit of the projection of a diffused, non-glaring light in regions above the horizontal plane of the lamp axis for the purpose of producing upper illumination, which, while effective for purpose of reading signs and permitting of clear discernment of overhead objects, will not produce glaring or obnoxious rays in the eyes of approaching drivers.

For a further understanding of the invention reference is to be had to the following description and the accompanying drawing, wherein:

Figure 1 is a front elevation of a vehicle headlight lens formed in accordance with the present invention, Figure 2 is a diagrammatic vertical sectional view taken through a vehicle head lamp provided with the lens comprising the present invention and disclosing the manner of projecting light therefrom, and Figure 3 is a detail horizontal sectional view on an enlarged scale taken on the line 3—3 of Figure 1.

Referring more particularly to Figures 1 and 2, use is made of a lens 1 which, in this form of the invention, has the upper half portion 2 thereof treated with a translucent color or coating for the purpose of intercepting the upper light rays projected from the reflector 3. In this form of the invention a standard type of lamp bulb 4 is utilized since by the use of the translucent upper part 2 of the lens, the ordinary clear glass bulb may be utilized and a non-blinding diffused light projected from the lamp as indicated by 5 in Figure 2. The lower half 6 of the lens 1 is provided with a clear, transparent, smooth surfaced central portion and with laterally located vertically extending prisms 7 on each side of said center portion. The clear glass central portion of the lens permits the reflector and bulb to produce a strong straight light beam which may be employed for illuminating distant zones, while the side prisms 7 are employed to refract the rays from the lamp for the purpose of illuminating the lateral zones or areas. The strong light beam is indicated at 8 in Figure 2 and is projected through the transparent area of the lens 1 in a plane below the diffused light beam 5. This upper beam is of sufficient intensity to provide for general overhead illumination, enabling signs and overhead objects to be readily revealed but not of sufficient intensity to interfere with or impair the vision of approaching drivers. The strong light beam 8 is confined to horizontal planes below the longitudinal axis of the lamp and is adapted to illuminate distant zones effectively but is so placed as to avoid the production of a dazzling glare in the eyes of approaching drivers. The prisms 7 diffuse a sufficient portion of the deflected light laterally to effectively illuminate the sides of a highway such as lateral curbing or ditches and in this respect provides for safety in motor vehicle operation.

An ordinary clear glass bulb is employed in this form of the head lamp, as shown in Figure 2. Preferably, the light producing filament 9 of the bulb is placed inwardly with respect to the true focal axis 10 of the reflector 3. This location of the bulb filament produces a forwardly directed, but at the same time downwardly and laterally spreading light beam, which I have found to be the most effective for the purposes of the lamp.

The construction set forth provides for ample illumination in all desired zones in advance of the head lights. The construction specifically prevents, however, the production of strong light in zones or areas where such light is unnecessary and serves no useful purpose. In the development of the construction above set forth I have endeavored to eliminate the chief faults found in present vehicle head lamps without departing radically from standardized constructions. In this connection it will be observed that the invention may be practiced by the employment of the lens 1, which may be used in connection with any standard type of head lamp or lamp bulb or reflector. I prefer to employ the focal adjustment of the bulb specified in the relation to the reflector, but of course do not limit the invention to this precise arrangement.

What is claimed is:

In motor vehicle headlamps, the combination with a light projector of a lens comprising a flat circular glass body having substantially the upper half thereof formed to produce a translucent area, the lower area of said lens having substantially transparent and prismatic surfaces provided at the sides of said lens and extending approximately equidistant into said translucent and transparent areas for directing a limited portion of the light passing through the lens laterally with respect to said lens, said lens having parallel surfaces upon the two sides thereof between said prismatic surfaces.

In testimony whereof I affix my signature.

FRANK C. McELROY.